United States Patent Office 2,995,450
Patented Aug. 8, 1961

2,995,450
PROCESS AND APPARATUS FOR MODIFYING MATERIAL
John M. Leach, 17 Monfort Road, Port Washington, N.Y.
Filed Jan. 5, 1960, Ser. No. 652
19 Claims. (Cl. 99—134)

The present invention relates to a substance modifying process and apparatus; and more particularly relates to a process and apparatus whereby absolute control of the temperature, and the actual heat imparted to the material being modified can be established exactly originally and accurately maintained uniformly throughout the full period of the modifying operation.

In modifying apparatus and processes heretofore employed, for example cooking, the rate and degree of cooking have been dependent upon the rate of flow of the material through the cooking apparatus as established by the pressure impressed upon the material. This has meant that any variation in the pressure, however great or small, has resulted in an inevitable variation in the flow which prevented the material from being uniformly cooked because some pressure variations can never be avoided in any system containing materials which are subject to coagulation; gelation; degeneration, reduction or any other change in physical or chemical qualities due to temperature, pressure or other changes.

It is an object of the present invention to provide a substance modifying process and apparatus in which the rate of flow can be made entirely independent of the pressure; in which the amount of heat applied to the material can be accurately controlled; in which a controlled pressure can be maintained with either a high or low rate of flow; and in which the rate of flow can be accurately controlled and scheduled even though pressure variations occur.

It is a further object of the present invention to provide a process and apparatus for modifying materials, for example cooking in a closed vessel, in which the material is positively removed from the walls of the vessel without the aid of externally connected operators other than the material itself.

It is a still further object of the present invention to provide a modifying, for example, cooking apparatus which is unusually simple in nature and which can be cleaned in a minimum length of time.

Other objects of the present invention will become apparent to those skilled in the art as the description of the invention in its now preferred form is disclosed.

Although the process and apparatus can be used to modify materials in many other ways, such as heat curing, cold curing, polymerizing, acidifying, hydrolyzing, etc., for the purpose of explanation it will be described in connection with a cooking operation.

For a more detailed description of the invention, reference should be had to the following specification taken in connection with the accompanying drawings, throughout which like reference characters refer to like parts and in which;

FIG. 4 is a diagrammatic view of one applicable type of control mechanism for the cooking element of FIG. 4, and FIG. 5 is a diagrammatic view of an alternate type of heating mechanism for the cooking elements.

Figure 1:
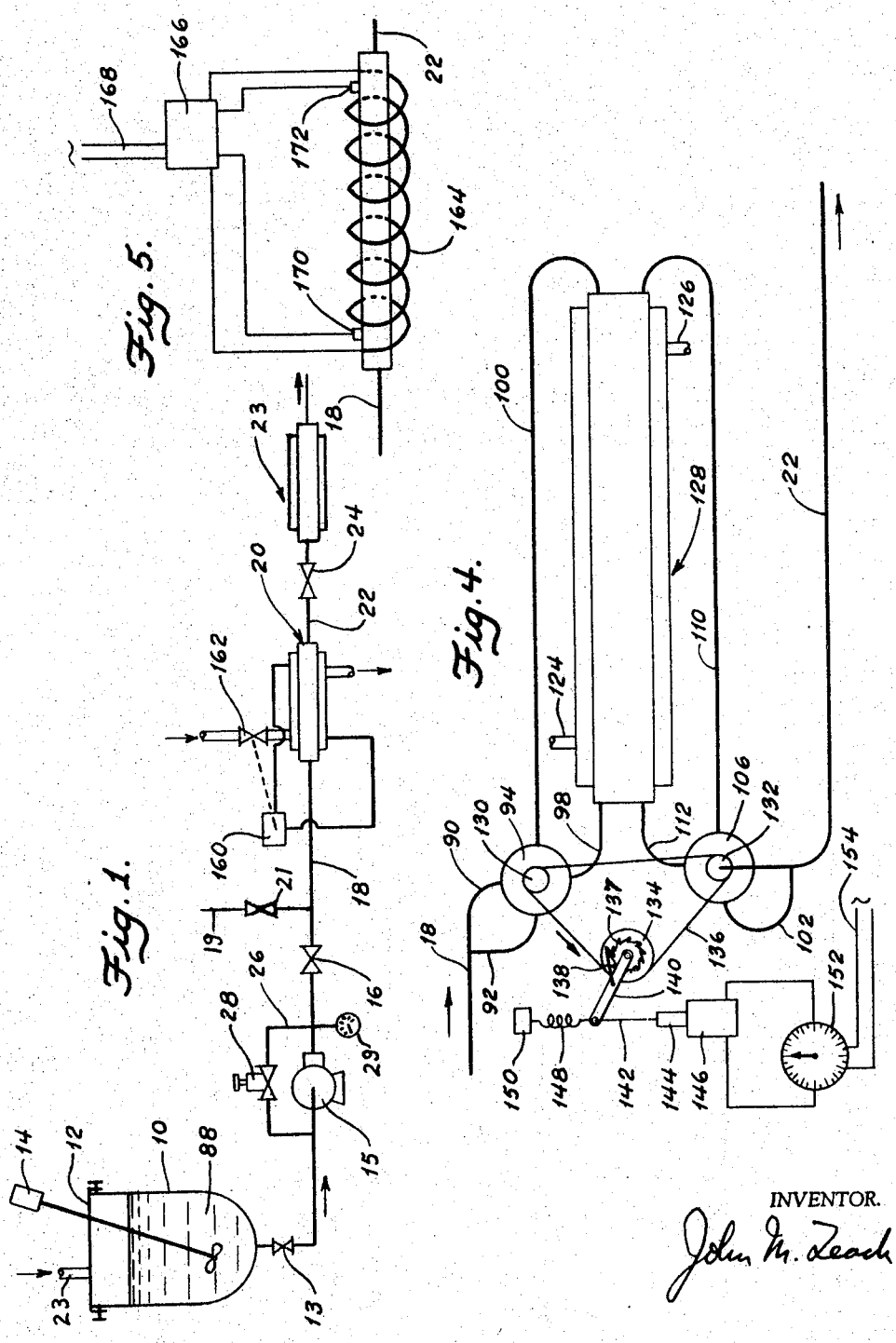
FIG. 1 is a diagrammatic view of the apparatus of the present invention.

The apparatus of the present invention, referring to FIG. 1, comprises a heating kettle 10 heated by any desired source (which is not shown) and provided with a quickly removable top 12 which can be suitably fastened into position and a conventional stirrer 14. The kettle 10 is provided with an outlet pipe having a conventional cut-off valve 13 which feeds into any desired type of pump 15 provided with an outlet pipe 18 which includes a throttling valve 16 and leads to a cooker 20 having an outlet pipe 22 provided with a throttling valve 24. A bypass 26 leads from the output to the input side of the pump and is provided with a conventional adjustable relief valve 28. A suitable pressure gauge 29 is connected to the pipe 18.

Figure 2:
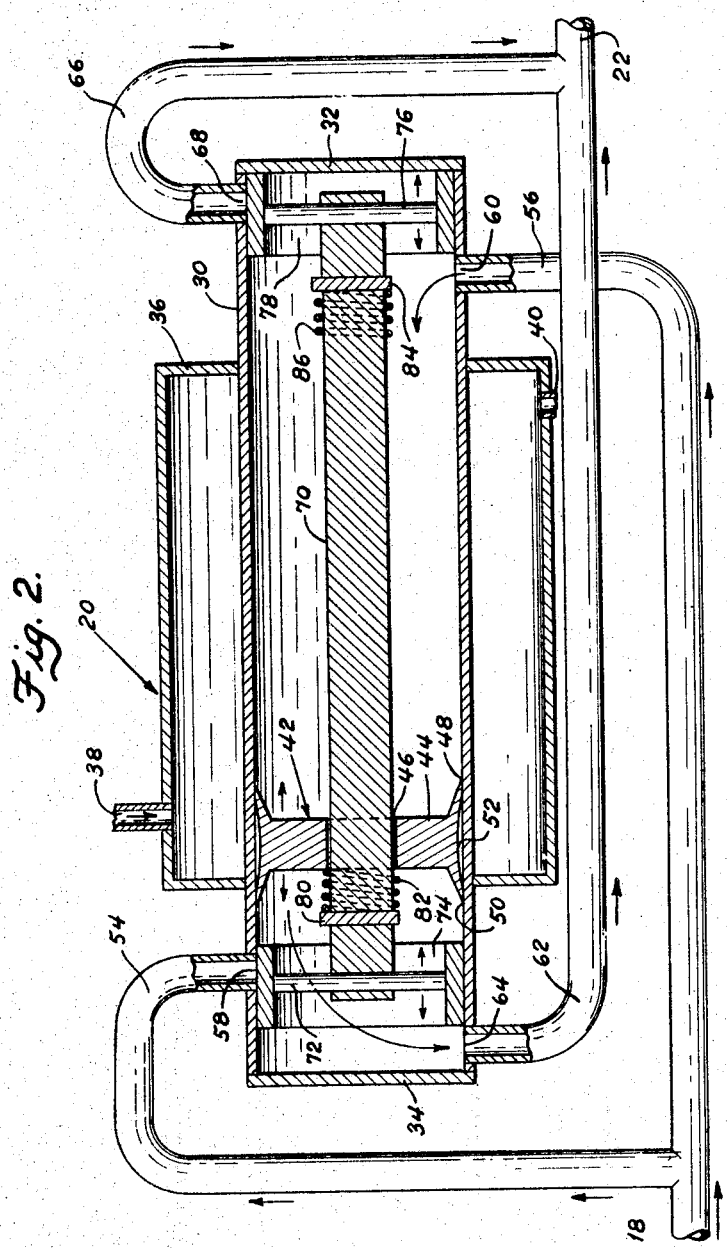
FIG. 2 is a cross sectional view of a cooking element of the present invention as exemplified by one modification thereof.

The cooking element 20, as shown in cross section FIG. 2, includes a chamber 30 having removable end headers 32 and 34 which are suitably held in assembled position by any desired type of fastener (not shown). The chamber 30, which is preferably cylindrical in shape, is provided with means for heating the contents of the chamber which may be any desired type of heating means such as an electrical heater; a gas heater or a steam jacket which is one type shown for the purpose of explanation. The steam jacket consists of a casing 36 which is supplied with steam by an inlet pipe 38 and from which the steam is exhausted by means of a pipe 40.

A shuttle member 42, which preferably consists of a body 44 provided with a central opening 46, is positioned for reciprocation within the chamber 30. The shuttle member 42 is preferably formed with sharp edges 48 and 50 and a central annular recess 52 which extends around the outer periphery of the shuttle 42. The diameter of the edge members 48 and 50 is just sufficiently smaller than the interior diameter of the chamber 30 to permit the shuttle member 42 to move backwards and forwards within the chamber 30 while maintaining snug scraping contact with the inside surface of the chamber 30.

The inlet pipe 18 is preferably branched as shown into sections 54 and 56. The branch 54 terminates in an opening in the side wall of the chamber 30 to provide an inlet port 58, and the branch 56 terminates in an opening in the opposite end of the side wall of the chamber 30 to form inlet port 60.

The outlet pipe 22 is branched as shown with one branch 62 terminating in an opening in the side wall of the chamber 30 as shown to form an outlet port 64 and the other branch 66 terminates in an opening in the opposite end of the side wall of the chamber 30 to form an outlet port 68.

A rod 70 which passes through the opening 46 in the shuttle member 42 is connected at one end to a cross rod 72 which is suitably fastened at its ends to the inside diameter of a sleeve valve 74, and is suitably fastened at its opposite end to a cross rod 76 which is suitably fastened at its ends to the inside diameter of a second sleeve valve 78.

The rod 70 is provided at one end with a fixed stop 80 against which a compression spring 82 abuts, and is provided at its opposite end with a second fixed stop 84 against which a second compression spring 86 abuts.

The widths of the sleeve valves 74 and 78 are selected relative to the positions of ports 58 and 64 and 60 and 68 so that when the sleeve valve 78 is positioned to the extreme right as shown in FIG. 2, it closes port 68 and opens port 60; and the length of the rod 70 and the relative positioning of the two sleeve valves thereon is such that at the same time the sleeve valve 74 closes the port 58 and opens port 64.

In the practice of the process of the present invention, material to be cooked 88 is filled into the kettle 10 and is heated while being stirred by the stirrer 14 to any desired preliminary temperature. When it is desired to finally cook the material the pump 15 is started, the relief valve 28 is set at the desired maximum pressure which pump 15 is to create at its output, the valve 13 is opened and the valve 16 is opened sufficiently to permit the heated material to flow into pipe 18 under any desired pressure and the valve 24 is adjusted to permit the material to leave the chamber at a rate which will establish the desired cooking time.

Referring to FIG. 2, the high pressure material from pipe 18 flows to branch 56 and port 60 and then to the interior of chamber 30 where it impinges upon the right side of the shuttle member 42 and forces it to the left. When the shuttle member 42 contacts spring 82 it compresses it until there is enough force built up in the spring acting against the fixed member 80 to move the rod 70 and the valve members 74 and 78 to the left. The action of the spring is such that once the rod and valve members are started in motion they will continue to move until they reach the end of their stroke; at which time the ports 64 and 60 will be closed and the ports 58 and 68 will be opened very rapidly. When this occurs the material will no longer flow through port 60 but will flow through branch pipe 54 and through port 58 instead and the pressure will cause the shuttle member 42 to move to the right as shown in FIG. 2; and the material which is at that time in the chamber 30 will be exhausted through port 68 and branch pipe 66 to the outlet pipe 22 at which time valve 24 is opened the amount desired and will permit the material to pass to any desired final disposition.

When the shuttle member 42 moves to the right sufficiently to contact spring 86, it will compress spring 86 acting against stop 84 and will build up enough pressure to move the rod 70 and valves 74 and 78 rapidly back to the position shown; at which time ports 68 and 58 will be closed and ports 60 and 64 will again be opened. This will permit the high pressure material to flow through port 60 and again move the shuttle member 42 to the left which will force the material then in chamber 30 ahead of it and out of exhaust pipe 62 into pipe 22 as before.

Prior to the beginning of the cooking operation, steam was admitted into the steam jacket through pipe 38 and exhausted at any desired rate through pipe 40 in known manner so as to heat the chamber 30 and its contents to any desired temperature controlled by any suitable type of thermostatic control, for example, of the type later described.

It will be noted that the cooker of the present invention subjects the contents of the chamber 30 to the heat of the steam jacket for a period while the contents being cooked are under pressure and moving the shuttle member 42 in one direction and also while the shuttle member 42 under movement from pressure on the opposite side is exhausting the former pressure material through the outlet pipe, which enables the chamber 30 to serve double duty in that the contents are heated through both a forward and backward stroke of the shuttle member 42.

The flow of material into chamber 30 and movement of the shuttle member 42 causes vigorous agitation of the material so that all of it is subjected to substantially the same amount of heat. However, where absolute uniformity of cooking is required, a second cooking element 23 can be employed in series with the first element as shown in FIG. 1. In this instance the first material to enter which is the last material to leave the first cooking element is the last material to enter and the first material to leave the second cooking element so that all material is subjected to absolutely the same amount of heat during the double cooking operation. Cooking element 23 is identical in construction with the first cooking element 20. The valve 24 is opened wide when two cooking elements are used and a suitable throttling valve is placed after the second cooker.

During the movement of the shuttle member 42 the sharp edges 48 and 50 effectively scrape off any material which tends to adhere to the heated surface of chamber 30 and puts it back in circulation before the material has an opportunity to burn due to the large amount of heat being added to the material. Because it is possible to apply any desired pressure to the shuttle member 42 by adjustment of the pressure relief valve 28, it is impossible for the shuttle member 42 to stall in its movement.

Figure 3:
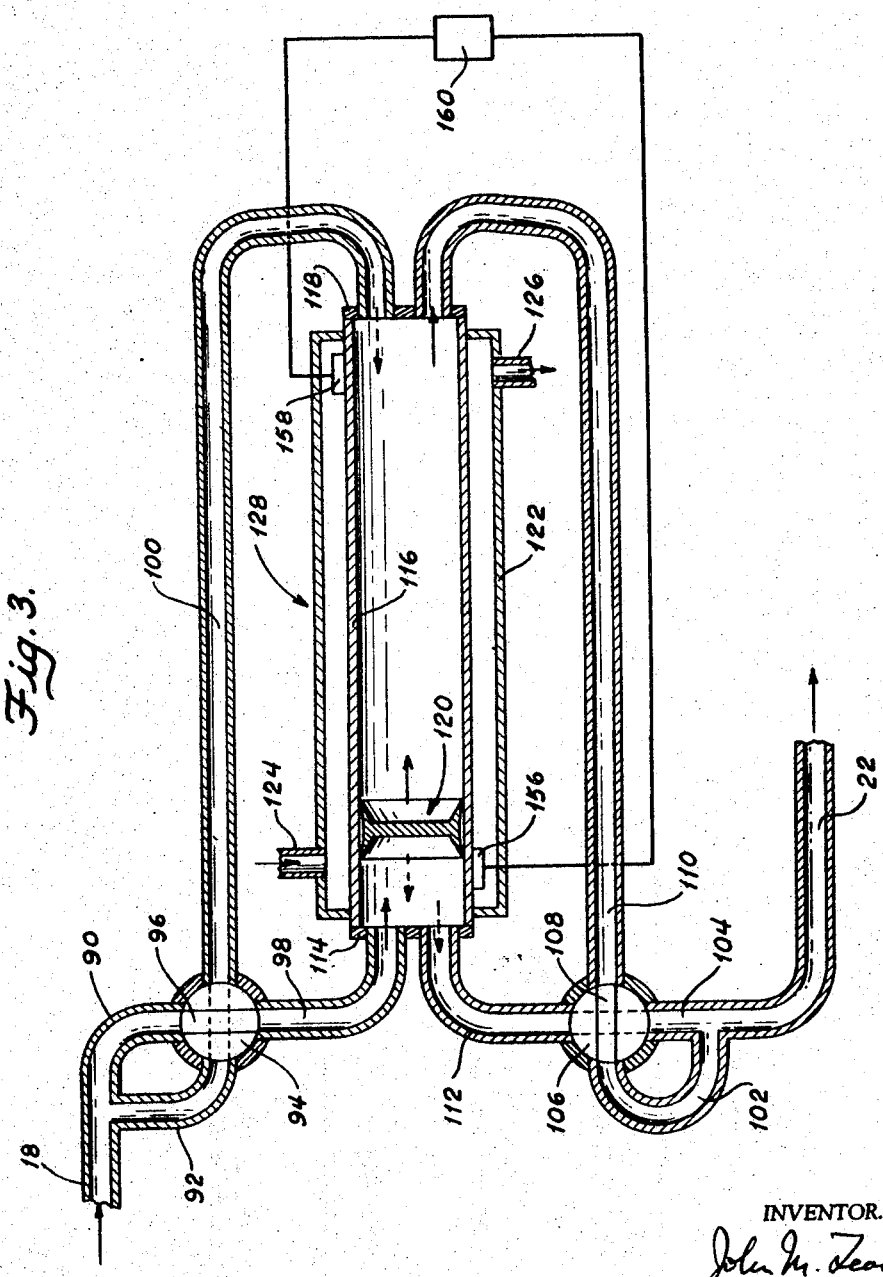
FIG. 3 is a cross sectional view of a cooking element of the present invention as exemplified by another modification thereof.

In the modification of the cooker shown in FIG. 3, the pipe 18 connects to two branch pipes 90 and 92 which connect to a rotary valve 94 which is provided with a central through port 96.

The port 96 is connected alternately to pipes 98 and 100 depending upon the position of rotation of the valve 94. The exhaust pipe 22 is connected to branch pipes 102 and 104 which are connected to a rotary valve 106 which is provided with a central through port 108. The port 108 alternately connects with pipes 110 and 112 depending on the position of rotation of valve 106.

The pipes 98 and 112 are suitably connected to an end header 114 which is suitably attached to a chamber 116 which is preferably in the form of a cylinder.

The pipes 100 and 110 are suitably connected to an end header 118 which is removably attached in any suitable manner to the cylinder 116.

A shuttle member 120 substantially identical with the shuttle member 42 with the exception of the opening 46 is fitted for reciprocation on the interior of the chamber 116 and has the same function and operation as the shuttle member 42 except that it does not operate any valves.

A heating means, which can be any desired heating means but is shown in this modification as a steam jacket 122, surrounds the chamber 116 and is supplied with steam under suitable pressure from any desired source by pipe 124 and the steam is exhausted from the steam jacket by a pipe 126.

The cooking element just described, which is identified as 128 in FIGS. 3 and 4, is provided with any suitable valve actuating mechanism which will index the two valves 94 and 106 in movements of 90 degrees, for example; as shown in FIG. 4. In the example shown, the valve actuating mechanism consists of a sprocket 130 connected to the valve 94 and a sprocket 132 connected to the valve 106, and these sprockets are suitably connected together and to a third sprocket 134 by a small timing chain 136. The sprocket 134 has a ratchet 137 connected to it which is intermittently operated by a pawl 138 connected to a lever arm 140 which is connected by a linkage 142 to the armature 144 of a suitable solenoid 146. The arm 140 is held in its uppermost position by a suitable tension spring 148 connected to any fixed point 150. The solenoid 146 is suitably electrically connected to any well known type of electrical timer 152 which is in turn connected to any suitable electrical source 154. The timer 152 is of the type which can be set to energize the solenoid 146 at desired intervals from a fraction of a minute up to 10 minutes or more. These electrical timers are normal articles of commerce and do not need to be described further in detail.

The valves 94 and 106 are connected together and with the sprocket 134 by means of the timing chain 136 so that in one limit position of the arm 140 the valve 94 is positioned with its through port 96 and the valve 106 is positioned with its through port 108 in the relative position shown in solid lines in FIG. 3. When the solenoid 146 is energized by the timer 152, the armature 144 moves downwardly and the link 142 moves downwardly which moves the arm 140 and the pawl 138 engages the ratchet 137 so as to rotate the valves 94 and 106 an even 90 degrees and position the ports 96 and 108 in the position shown in dotted lines in FIG. 3. The solenoid 146 is energized only for a short time and upon deenergization the spring 148 retracts the arm 140 and the armature 144 into the upper position where it is ready for actuation of the valves into another 90 degree position upon the next energization of the solenoid 146 by the timer 152.

In the operation of the process and equipment shown in FIG. 3, the preliminary heating of the material to be cooked is carried out exactly as when the cooker 20 is utilized and the cooker 128 is used either singly or two in series exactly as described above in regard to cooker 20. The timer 152 is set so as to operate at any desired interval to rotate the valves 94 and 106 intermittently as explained above. Starting, for example, with the valves 94 and 106 in the relative positions shown in solid lines in FIG. 3, the material to be cooked under pressure from the pump 15 flows to pipe 18 into branch pipe 90, through the port 96 in valve 94, into branch pipe 98 and into the interior of chamber 116 where it moves the shuttle member 120 to the right as shown in FIG. 3. When the shuttle member 120 reaches the extreme right position of its movement it rests there as long as required until the timer 152 energizes solenoid 146. At that time the valves 94 and 106 are rotated 90 degrees which brings through ports 96 and 108 into the relative positions shown in dotted lines in FIG. 3. At that time the material to be cooked under pressure from the pump 15 flows through branch pipe 92 through port 96, branch pipe 100 and into the right hand end of the cooking chamber 116. At this time no liquid can flow through pipe 98 or pipe 110 because of the positions of the respective valves 94 and 106. The material being cooked in the chamber 116 does flow, however, through pipe 112 and through port 108 into the exhaust pipe 22 and to its desired destination.

When shuttle member 120 reaches its extreme point of movement to the left, it rests there until timer 152 again causes the rotation of the valves 94 and 106 through an angle of 90 degrees as previously explained at which time pressure material again flows through pipe 90, through port 96 and pipe 98 into the interior of chamber 116 and moves the shuttle member 120 to the right. During this movement the material then being cooked flows through pipe 110; port 108 and branch pipe 102 to the exhaust pipe 122 as before.

During the operation of cooking element 128, the valve 28 preferably is set so that pump 15 exerts sufficient pressure on the shuttle member 120, or both shuttle members 120 when two elements 128 are used in series, to cause shuttle member 120 to reach the end of its stroke as rapidly as possible so that a minimum of time is required to fill and empty the chamber or chambers 116. In this manner substantially all of the material is heated uniformly and the scraping action of shuttle member 120 is vigorous and very effective.

The amount of steam entering chamber 36 or 128 and which determines the amount of heat imparted to the material being cooked in the chamber 30 or 116 can be controlled by any desired thermostatic control, such, for example, as the two thermocouples 156 and 158 which are suitably connected to a controller 160 which can be a recording type of thermostatic controller which can open and close the valve 162 which controls the flow of steam to the inlet pipe 124 or 38; depending on which modification of the cooker is being used. This type of thermostatic control is a well known item of commerce, can be purchased on the open market, and requires no further detailed description.

A highly desirable electrical type of heater for the cooking elements 20 and 128 is shown in FIG. 5 and consists of an electrical high frequency induction type heater coil 164 suitably connected to an electrical power source 166 which is energized by a suitable power source 168 and is under control of thermocouples 170 and 172.

This type of induction heater is also a well known article of commerce and requires no further description.

During the operation of the heater shown in FIG. 5 the induction coil 164 very rapidly heats the metal of the cooker which may be of the type shown in either FIG. 2 or 3; and this rapid application of heat is controlled by the regulator 166 so as to impart the exact amount of heat to the contents of the cooker. Because the heat can be applied and eliminated so rapidly, the heating of the contents can be controlled with unparalleled accuracy and within extremely narrow limits of temperature variation occuring within the material being cooked. This enables the cooking to be controlled to a degree not possible heretofore.

At the end of a cooking operation, in order to clear the cokers of all material, the valve 16 is closed and a valve 21 (see FIG. 1) is opened which leads to a compressed air pipe 19. The compressed air will cause the shuttle members 42 and 120 to function the same as when a liquid is used and will effectively clear the cookers of all liquid without contaminating any of it. When a general cleaning is desired, water is admitted to kettle 10 through pipe 23 and the cookers are operated the same as when cooking is taking place and the shuttle members and the hot water will thoroughly clean all of the equipment.

The process and apparatus of the present invention can be used for modifying, for example, cooking many different materials; for example, soups, broths; gelatin; milk products; ice cream mixes; jellies; fruit syrups and concentrates; vegetable concentrates; tree gum concentrates such as gum acacia; seed oil concentrates such as linseed oil; sugar containing products such as corn syrup, cane or beet syrup, hard boiled candies such as pops, hard balls and coatings for filled pieces; fondant; caramel; soft boiled candies such as gum drops and jelly fillings; starch containing materials such as mayonnaises, puddings; pie fillings, paper coatings, textile sizings, adhesives, brewing pastes and many other substances heretofore found difficult to cook.

In order to illustrate the many advantages of the process and apparatus of the present invention its superiority in the cooking of starch base jelly or gum candies will be considered. This particular item is selected because it is produced in large commercial quantities.

Many attempts have been made to improve on the conventional gum candy cooking process which consisted in cooking in large open kettles which was very time consuming and required great skill and experience on the part of the operator. The outstanding difficulty encountered in improving the cooking process for the starch and sugar slurry from which this confection is made was the tendency, which is characteristic of all starch containing substances, to stick to the walls of the cooking vessel when high temperature fast cooking was attempted which caused the thin layer of material adhered to the vessel walls to burn and discolor and foul the taste of the final product.

One attempt to overcome this difficulty was to subject the slurry to high heat in a closed vessel and rapidly scrape the vessel walls by blades driven by power delivered through a shaft extending through the vessel walls. This necessitated the use of a large expensive piece of equipment and the starch rapidly accumulated in the shaft seals at the bearings in the vessel walls which necessitated frequent cleaning which was difficult and time consuming and required the efforts of skilled personnel. The cost of such equipment was also well beyond the means of many small producers.

Another attempt to overcome this difficulty was to utilize the old starch cooking or digesting procedure of injecting live steam directly into the slurry. An inevitable consequence of this was introduction of the many foreign substances always found in steam which is generated in the boiler water into the slurry which gave the final confection an off-taste and also introduced a cloudy appearance.

A third procedure was to pass a small cross sectional stream of slurry very rapidly through a cooking vessel heated sufficiently to finally cook the slurry in the very short time it took for the passage through the vessel. The slurry was not exposed to the walls of the vessel long enough for the starch to adhere to the walls or for the sugar to caramelize. This procedure overcame the objections to the other procedures but required that the vessel temperature be lowered below cooking values before the end of the run in order to avoid burning of the residue in the vessel which resulted in some waste of material. With the process and apparatus of the present invention it is impossible for any foreign material to be introduced into the cooking operation at any time and the uncertain heating action of live steam is also avoided. The heat instead is at all times uniformly and cleanly transmitted through a metallic wall which is continually mechanically scraped clean of any deposit which might impede the orderly progress of heat transfer and also might cause discoloring and spoiling of the taste of the final product. All of this is accomplished with a very simple, durable and self-cleaning apparatus which is very low in first cost and maintenance. Furthermore, it is now possible to control the modifying time of any desired substance with absolute accuracy and without regard to pressure variations in the substance being modified because the time of exposure to the heat can be controlled to a split second by the timing mechanism and the amount of heat applied in any given interval can be accurately controlled by the temperature regulating mechanism. In addition, all of the material being treated can be cooked uniformly without any waste, and the equipment can be cleaned by merely adjusting valves without requiring any regular disassembly of the equipment.

The invention having been described, what is claimed is:

1. A process of manufacturing starch base confectionery which comprises directing a starch base confectionery starting material under pressure into a closed chamber, applying heat to the material in the chamber, moving a scraper member along the wall of the chamber by means of the pressure created by the material impinging thereagainst, and discharging the cooked material from the chamber.

2. A process of manufacturing confectionery which comprises directing confectionery starting material under pressure into a closed chamber, moving a scraper member along the wall of the chamber by means of the pressure created by the material impinging thereagainst, and discharging the material from the chamber.

3. A cooking process which comprises directing material to be cooked under pressure into a chamber, applying heat to the material in the chamber, moving a scraper member along the wall of the chamber by means of the pressure of the material impinging upon the scraper member, and discharging the cooked material from the chamber.

4. A process of modifying material which comprises directing the material to be modified into a closed chamber under pressure, exerting a modifying influence upon the material in the chamber, moving a scraper member along the wall of the chamber by the pressure of the material undergoing modification, and discharging the modified material from the chamber.

5. A process of cooking starch base confectionery which comprises directing the material to be cooked into a closed chamber under pressure, applying heat to the material in the chamber through the walls of the chamber, moving a scraper member along the walls of the chamber by the pressure of the material, and discharging the cooked material from the chamber.

6. A process of cooking starch base material which comprises directing the material into a closed chamber under pressure, applying heat to the material through the walls of the chamber, moving a scraper along the wall of the chamber by the pressure of the material, and discharging the cooked material from the chamber.

7. A process of cooking material comprising directing the material into a closed chamber, applying heat to the material, moving a scraper along the wall of the chamber by the pressure of the material, timing the length of time of application of the heat to the material, and discharging the cooked material from the chamber.

8. A cooker comprising a chamber, means for directing material into the chamber under pressure, means for exhausting the material from the chamber, means for applying heat to the material in the chamber, and means operated by the pressure of the material in the chamber for scraping material from the chamber wall and activating the means for directing material into the chamber and the means for exhausting material from the chamber.

9. A cooker comprising a chamber, means for directing material into the chamber under pressure, means for exhausting material from the chamber, means for applying heat to the material in the chamber, and means operated by the pressure of the material for scraping the wall of the chamber.

10. A cooker comprising a chamber, means for directing material under pressure, valve means for controlling the entrance to and exit of material from the chamber, means for receiving material from the chamber, and a member operated by the pressure of the material for scraping the walls of the chamber.

11. A cooker comprising a chamber, means for directing material under pressure to the chamber, means for receiving material from the chamber, valve means for controlling the entrance to and exit of material from the chamber, and a member operated by the pressure of the material for scraping the wall of the chamber and activating the valve means.

12. A cooker comprising a chamber, means for directing material to be cooked to the chamber, means for receiving material from the chamber, valve means for controlling the entrance to and exit of the material from the chamber, a member operated by the material for scraping the walls of the chamber, and a timing means for operating the valve means.

13. A cooker comprising a chamber, a pressure creating means for directing material to be cooked to the chamber, means for receiving cooked material from the chamber, valve means disposed within the chamber for controlling the entrance to and exit of the cooked material from the chamber, means for applying heat to the material in the chamber, and a member operated by the pressure of the material being cooked to scrape material from the wall of the chamber and also operate the valve means.

14. A cooker comprising a chamber, a pressure creating means directing material to be cooked to the chamber, means for receiving material from the chamber, valve means for controlling the entrance to and exit of material from the chamber, a member operated by the pressure of the material to scrape material from the chamber wall, and means for operating the valve means.

15. A cooker comprising a chamber, a pressure creating means for directing material to be cooked to the chamber, means for receiving material from the chamber, valve means for controlling entrance to and exit of material from the chamber, timing means for operating the valve means, and means operated solely by the movement of the material being cooked to scrape material from the wall of the chamber.

16. A cooker comprising a chamber, means for directing material to be cooked to the chamber, means for receiving material from the chamber, valve means for controlling the entrance to and exit of material from the chamber, a steam jacket for applying heat to the material in the chamber, and a scraper operated by movement of the material to scrape the wall of the chamber.

17. A cooker comprising a chamber, means for directing material into the chamber under pressure, means for receiving material from the chamber, a high frequency inductive electrical heater for the chamber, and a member moved by the material for scraping material from the wall of the chamber.

18. A cooker comprising a chamber, means for directing material to the chamber under pressure, means for receiving material from the chamber, valve means for controlling the entrance to and exit of material from the chamber, a high frequency inductive heater for the chamber, a member moved by the material for scraping the wall of the chamber, and electrical timing means for operating the valve means.

19. A cooker comprising a chamber, means for directing material to the chamber under pressure, means for receiving material from the chamber, valve means for controlling the entrance to and exit of material from the chamber, a steam jacket for heating the chamber, a member moved by the material for scraping the wall of the chamber, and electrical timing means for operating the valve means.

References Cited in the file of this patent

UNITED STATES PATENTS

| | | |
|---|---|---|
| 1,731,048 | Holmes et al. | Oct. 8, 1929 |
| 2,555,018 | Von Seggern | May 29, 1951 |
| 2,726,960 | Bolanowski | Dec. 13, 1955 |
| 2,835,589 | Whitefield | May 20, 1958 |